United States Patent Office 2,930,728
Patented Mar. 29, 1960

2,930,728

BUTADIENE-STYRENE-ALBUMIN ADHESIVE COMPOSITION AND METHOD OF JOINING MEMBERS THEREWITH

Victor A. Navikas, Lancaster Township, Lancaster County, Pa., assignor to Armstrong Cork Company, Lancaster, Pa., a corporation of Pennsylvania No Drawing. Application February 26, 1954
Serial No. 412,943

9 Claims. (Cl. 154—89)

This invention relates to an adhesive, its preparation, and method of use and is concerned more particularly with the adhesive joining of a sealing liner in a metal bottle closure shell, such as a crown cap.

In the manufacture of closures of the crown type, the adhesive is generally applied to the inner surface of the shell and the liner is pressed thereagainst. Heat is applied to the outer decorated surface of the shell and is conducted through the shell to the adhesive and the same is activated while the assembly of shell and liner is held under compression. The shells and liners are assembled together at very high speeds, generally from 600 to 800 or more per minute per assembly machine, and this imposes many serious problems. Many of these are directly related to the adhesive which must be capable of being rapidly set at a relatively low temperature, preferably between 230° F. and 260° F. It must be of such consistency that it can be applied readily to rapidly moving closure shells and should be stable over relatively long periods of time without substantial change in viscosity so that uniform application may be made on long runs or after periods of idleness, as over week ends when an assembly plant may be out of operation and it may be necessary to store the adhesive under refrigeration. The adhesive should be formulated to withstand mechanical working in the machines which apply the adhesive to the closure shells. Many prior adhesives have failed because they could not withstand such working, having precipitated out one or more of the components after relatively short working periods. There are many other problems recognized by those engaged in the closure art.

The invention is directed particularly to the metal bottle closure assembly art, but it will be understood that the adhesive is one which may be used in other services where a heat-activatable adhesive is required, having good stability and low temperature activation characteristics and providing a flexible, strong bond at relatively low cost.

The adhesive of the present invention comprises a compatible and stabilized mixture including an aqueous solution of albumin buffered to a pH of 7.5 to 8.5 and butadiene-styrene synthetic rubber (preferably in latex form prepared by emulsion polymerization of the monomeric ingredients) adjusted to essentially the same pH as the albumin solution. The composition may include as the principal binder ingredients 50% to 70% of albumin and about 50% to 30% of latex, both on a dry solids basis, and the adhesive may have a solids content of 50% or more, depending upon the material to be joined and the process of joining employed. The albumin may be egg or blood albumin or a mixture of both. The preferred buffering agent for the albumin is borax, but other buffering agents having a low ionization constant may be substituted.

The following is a specific example of an adhesive made in accordance with the invention:

*Example I*

|  | Composition | | Percent by Wt. Albumin Solution | Total Percent Wet Comp. |
|---|---|---|---|---|
|  | Pounds | Percent by Wt. | | |
| Solution I: | | | | |
| Dry Egg Albumin (5.5 pH) | 105.0 | 34.6 | 52.1 | |
| Water | 91.0 | 30.0 | 45.1 | 66.4 |
| Borax | 5.61 | 1.8 | 2.8 | |
|  |  |  | 100.0 | |
| Solution II: | | | | |
| Butadiene-styrene Latex (10 pH—50% solids) | 101.0 | 33.3 | | |
| Acetic Acid (10% by vol.) | 0.79 | 0.3 | | 33.6 |
|  | 303.40 | 100.0 | | 100.0 |

This batch will have a total solids content of about 53.1% and the ratio of egg albumin to butadiene-styrene on a dry solids basis will be about 67 to 33.

In preparation of the adhesive the borax is dissolved in warm water and added to the egg albumin. The egg albumin as received may have a pH of about 5.5 and the buffered solution a pH of about 8.0. The mixture is permitted to soak to obtain maximum solubility. A homogeneous solution is developed by stirring the soaked mixture until there is no evidence of swollen albumin particles.

The butadiene-styrene latex as received may have a pH of about 10.0 and it is preferably adjusted to a pH of about 8.0, the same as the albumin solution, by the addition of acetic acid. This may be accomplished by slowly stirring the latex while gradually adding the acetic acid.

The buffered albumin solution and the adjusted latex are blended together. Care should be exercised in this operation to insure proper combination of the ingredients, free of "seeds" which result if the latex is broken. Blending may be accomplished by slowly adding the latex to the albumin solution while stirring is effected immediately to incorporate the latex into the mixture. This will produce a mixture having a viscosity in the range of 12 to 20 seconds with a No. 15 Parlin cup, employing the standard Parlin cup procedure for viscosity determination as described in Gardner and Sward, "Physical and Chemical Examination of Paints, Varnishes, Lacquers and Colors," 11th edition, 1950.

The following is an example of an adhesive made in accordance with the invention, using a mixture of egg and blood albumin:

*Example II*

|  | Composition | | Percent by Wt. Albumin Solution | Total Percent Wet Comp. |
|---|---|---|---|---|
|  | Pounds | Percent by Wt. | | |
| Solution I: | | | | |
| Dry Blood Albumin (6.2 pH) | 29.0 | 10.2 | 37.1 | |
| Water | 48.0 | 16.8 | 61.3 | |
| Borax | 0.93 | 0.3 | 1.2 | 27.4 |
| Tributyl Phosphate (anti-foaming agent) | 0.30 | 0.1 | 0.4 | |
|  |  |  | 100.0 | |
| Solution II: | | | | |
| Dry Egg Albumin (5.5 pH) | 43.0 | 15.1 | 57.4 | |
| Water | 30.0 | 10.5 | 40.1 | 26.2 |
| Borax | 1.85 | 0.6 | 2.5 | |
|  |  |  | 100.0 | |
| Solution III: | | | | |
| Butadiene-styrene Latex (10 pH—50% solids) | 131.0 | 46.0 | | |
| Acetic Acid (10% by vol.) | 1.03 | 0.4 | | 46.4 |
|  | 285.11 | 100.0 | | 100.0 |

The adhesive of Example II may be prepared in much the same manner as that of Example I. The borax and tributyl phosphate of solution I, the latter an anti-foaming agent, may be dissolved in warm water. The blood albumin may be added to this solution with slow speed mixing until all the blood albumin is thoroughly wetted and all large lumps are reduced to small particle size. This produces a mixture having a pH of about 8. The solution is allowed to soak to obtain a good solution of the blood albumin in the water.

Solution II, the egg albumin solution, may be prepared as outlined in Example I.

The butadiene-styrene latex solution, solution III, may be prepared and adjusted to a pH of about 8, the same as the blood and egg albumin solutions, in the manner set forth in Example I.

The blood albumin and egg albumin solutions, solutions I and II, are now combined and blended with a slow speed mixer until a homogeneous solution of the two has been obtained. The adjusted butadiene-styrene latex is then blended with the mixed albumin solutions in the same manner as the latex and albumin are blended in Example I.

The batch will have a solids content of about 49.3, and the ratio of albumin to butadiene-styrene on a dry solids basis will be about 53 to 47. The viscosity will be essentially the same as the composition of Example I.

While egg albumin or a mixture of egg and blood albumin have been used in the specific examples, blood albumin may be used as the albumin component or proportions of egg and blood albumin other than the ratio given in Example II may be employed. Borax is the preferred buffering material, but other buffers having a low ionization constant may be used alone or in various combinations with borax or with one another. Agents such as sodium citrate, disodium phosphate, dipotassium phosphate, mixtures of di- and mono-sodium phosphate or di- and mono-potassium phosphate fall within the definition of suitable buffering materials. These agents do not denature or coagulate the albumin; those agents which would have a deleterious action of that nature on the albumin should be avoided.

It is preferred to use a butadiene-styrene latex formed by emulsion polymerization of 40% butadiene and 60% styrene monomers, but other emulsion polymerization products of butadiene and styrene may be used containing from 40% to 50% butadiene and 60% to 50% styrene. For some services, dispersions of butadiene-styrene synthetic rubber may be used; but, because of the superior stability of the latex type products, they are preferred for most uses.

While it is preferred to buffer the albumin solution to a pH of 8, a tolerance of ±.5 in pH is permissible. The same is true of the adjustment of the butadiene-styrene rubber. Preferred practice is to adjust to a pH of 8 but pH of 7.5 to 8.5 will be acceptable.

The viscosity of the adhesive may be varied depending upon its use. The viscosity given in the examples is ideal for crown closure shell and liner assembly with automatic assembly machines.

In the manufacture of closures according to the present invention the adhesive in a stabilized and compatible condition is disposed between the shell and liner and heat is applied to the adhesive, as by application to the shell and by conduction therethrough to the adhesive, and this results in denaturation and coagulation of the albumin, accompanied by breaking and deposition of the solids of the butadiene-styrene polymerization product. The albumin and butadiene-styrene rubber components retain their compatibility and there results the formation of an excellent bond between the liner and shell. Activation may be accomplished at a low temperature, in the order of 230° F. to 260° F., and assembly at rates of 600 per minute and higher may be achieved readily.

I claim:

1. An adhesive comprising a compatible and stabilized mixture including (a) 50% to 70% by weight on a dry solids basis of an aqueous solution of albumin buffered to a pH of 7.5 to 8.5, said albumin being selected from the group consisting of egg albumin, blood albumin, and mixtures thereof, and (b) 50% to 30% by weight on a dry solids basis of butadiene-styrene latex containing from 40% to 50% butadiene and 60% to 50% of styrene in the polymerization molecule, said latex being adjusted to essentially the same pH as the albumin solution.

2. An adhesive in accordance with claim 1 in which the mixture has a solids content of at least 50%.

3. An adhesive in accordance with claim 1 in which the albumin is buffered with an alkaline buffer salt selected from the group consisting of borax, sodium citrate, mono-sodium phosphate, mono-potassium phosphate, disodium phosphate, dipotassium phosphate, and mixtures thereof.

4. An adhesive in accordance with claim 3 in which the buffering salt is borax.

5. In a method of preparing an adhesive from a mixture of albumin selected from the group consisting of egg albumin, blood albumin, and mixtures thereof, and butadiene-styrene rubber containing from 40% to 50% butadiene and 60% to 50% of styrene in the polymerization molecule, the improvement which comprises increasing the compatibility and stability of the system by buffering to a pH of 7.5 to 8.5 an aqueous solution of the albumin with an alkaline buffer salt to provide a homogeneous albumin solution and then mixing 50% to 70% by weight on a dry solids basis of the said buffered albumin solution with 50% to 30% by weight on a dry solids basis of an aqueous dispersion of said rubber adjusted to essentially the same pH as the albumin solution to provide a system the hydrogen ion concentration of the principal components of which is essentially in equilibrium.

6. In a method of preparing an adhesive from albumin selected from the group consisting of egg albumin, blood albumin, and mixtures thereof, and butadiene-styrene latex, the steps comprising forming an aqueous solution of the albumin buffered to a pH of 7.5 to 8.5 and mixing 50% to 70% by weight on a dry solids basis of such solution with 50% to 30% by weight on a dry solids basis of butadiene-styrene latex containing from 40% to 50% butadiene and 60% to 50% of styrene in the polymerization molecule, said latex being adjusted to essentially the same pH as the albumin solution to form a stabilized, compatible mixture of the two.

7. In a method of preparing an adhesive from a mixture of albumin selected from the group consisting of egg albumin, blood albumin, and mixtures thereof, and butadiene-styrene rubber containing from 40% to 50% butadiene and 60% to 50% of styrene in the polymerization molecule, the improvement which comprises increasing the compatibility and stability of the mixture by buffering to a pH of 7.5 to 8.5 an aqueous solution of the albumin with an alkaline buffer salt selected from the group consisting of borax, sodium citrate, mono-sodium phospate, mono-potassium phosphate, disodium phosphate, dipotassium phosphate, and mixtures thereof to provide a homogeneous albumin solution and then mixing 50% to 70% by weight on a dry solids basis of the said buffered albumin solution with 50% to 30% by weight on a dry solids basis of an aqueous dispersion of said rubber adjusted to essentially the same pH as the albumin solution to provide a mixture the hydrogen ion concentration of the principal components of which is essentially in equilibrium.

8. In a method of making closures by adhesively joining a sealing liner to a closure shell, the steps comprising positioning said liner in said shell with an aqueous adhesive interposed therebetween and including (a) 50% to 70% by weight on a dry solids basis of an aqueous solution of albumin buffered to a pH of 7.5 to 8.5, said albumin being selected from the group consisting of egg albumin, blood albumin, and mixtures thereof, and (b) 50% to 30% by weight on a dry solids basis of butadiene-styrene latex containing from 40% to 50% of butadiene and 60% to 50% of styrene in the polymerization molecule, adjusted to essentially the same pH as the albumin solution, and applying heat to said adhesive to remove water therefrom and to denature and coagulate said albumin and simultaneously to break said latex, thereby activating said adhesive and joining said shell and liner together.

9. In a method of adhesively joining members, the steps comprising assembly said members in face-to-face relationship with an aqueous adhesive interposed therebetween and including as components: (a) 50% to 70% by weight on a dry solids basis of an aqueous solution of albumin buffered to a pH of 7.5 to 8.5 with an alkaline buffer salt selected from the group consisting of borax, sodium citrate, mono-sodium phosphate, monopotassium phosphate, disodium phosphate, dipotassium phosphate, and mixtures thereof, said albumin being selected from the group consisting of egg albumin, blood albumin, and mixtures thereof, and (b) 50% to 30% by weight on a dry solids basis of butadiene-styrene latex containing from 40% to 50% of butadiene and 60% to 50% of styrene in the polymerization molecule, adjusted to essentially the same pH as the albumin solution, and applying heat to said adhesive to remove water therefrom and to denature and coagulate said albumin and simultaneously to break said latex, thereby activating said adhesive with said components retaining their compatibility.

References Cited in the file of this patent

UNITED STATES PATENTS

| | | |
|---|---|---|
| 2,080,265 | Gutmann | May 11, 1937 |
| 2,479,959 | O'Neil | Aug. 23, 1949 |
| 2,557,169 | Benner | June 19, 1951 |
| 2,580,040 | Munsell | Dec. 25, 1951 |
| 2,605,242 | Betts et al. | July 29, 1952 |

FOREIGN PATENTS

| | | |
|---|---|---|
| 576,665 | Great Britain | Apr. 15, 1946 |